US011422931B2

(12) United States Patent
Li

(10) Patent No.: US 11,422,931 B2
(45) Date of Patent: Aug. 23, 2022

(54) METHOD AND SYSTEM FOR FACILITATING A PHYSICALLY ISOLATED STORAGE UNIT FOR MULTI-TENANCY VIRTUALIZATION

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 141 days.

(21) Appl. No.: 16/904,218

(22) Filed: Jun. 17, 2020

(65) Prior Publication Data

US 2021/0397547 A1    Dec. 23, 2021

(51) Int. Cl.
*G06F 12/02* (2006.01)
*G06F 11/10* (2006.01)
*G06F 9/455* (2018.01)

(52) U.S. Cl.
CPC ...... *G06F 12/0246* (2013.01); *G06F 9/45558* (2013.01); *G06F 11/1068* (2013.01);
(Continued)

(58) Field of Classification Search
CPC ............ G06F 12/0246; G06F 9/45558; G06F 11/1068; G06F 2009/45583;
(Continued)

(56) References Cited

U.S. PATENT DOCUMENTS 3,893,071 A   7/1975  Bossen
4,562,494 A   12/1985 Bond
(Continued)

FOREIGN PATENT DOCUMENTS

JP   2003022209   1/2003
JP   2011175422   9/2011
(Continued)

OTHER PUBLICATIONS

C. Wu, D. Wu, H. Chou and C. Cheng, "Rethink the Design of Flash Translation Layers in a Component-Based View", in IEEE Acess, vol. 5, pp. 12895-12912, 2017.
(Continued)

*Primary Examiner* — John J Tabone, Jr.
(74) *Attorney, Agent, or Firm* — Shun Yao; Yao Legal Services, Inc.

(57) ABSTRACT

One embodiment provides a system which facilitates organization of data. During operation, the system allocates, to a function associated with a host, a number of block columns to obtain a physical storage space for the function, wherein a block column corresponds to a block from each of a plurality of dies of a non-volatile storage device. In response to processing an incoming host write instruction and an internal background write instruction, the system allocates a first block column to the incoming host write instruction and a second block column to the internal background write instruction, thereby extending a lifespan of the non-volatile storage device by recycling the first block column when deleting a namespace or virtual machine associated with the function.

20 Claims, 11 Drawing Sheets

(52) U.S. Cl.
CPC ............... *G06F 12/0253* (2013.01); *G06F 2009/45583* (2013.01); *G06F 2201/805* (2013.01); *G06F 2212/7206* (2013.01)

(58) Field of Classification Search
CPC ....... G06F 2201/805; G06F 2212/7206; G06F 12/0253
USPC ................ 714/772, 773, 763, 768, 805, 6.2; 369/30.22; 711/104, 114
See application file for complete search history.

(56) References Cited

U.S. PATENT DOCUMENTS

| | | | |
|---|---|---|---|
| 4,718,067 A | 1/1988 | Peters | |
| 4,775,932 A | 10/1988 | Oxley | |
| 4,858,040 A | 8/1989 | Hazebrouck | |
| 5,394,382 A | 2/1995 | Hu | |
| 5,602,693 A | 2/1997 | Brunnett | |
| 5,715,471 A | 2/1998 | Otsuka | |
| 5,732,093 A | 3/1998 | Huang | |
| 5,802,551 A | 9/1998 | Komatsu | |
| 5,930,167 A | 7/1999 | Lee | |
| 6,098,185 A | 8/2000 | Wilson | |
| 6,148,377 A | 11/2000 | Carter | |
| 6,226,650 B1 | 5/2001 | Mahajan et al. | |
| 6,243,795 B1 | 6/2001 | Yang | |
| 6,457,104 B1 | 9/2002 | Tremaine | |
| 6,658,478 B1 | 12/2003 | Singhal | |
| 6,795,894 B1 | 9/2004 | Neufeld | |
| 7,351,072 B2 | 4/2008 | Muff | |
| 7,565,454 B2 | 7/2009 | Zuberi | |
| 7,599,139 B1 | 10/2009 | Bombet | |
| 7,953,899 B1 | 5/2011 | Hooper | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,527,544 B1 | 9/2013 | Colgrove | |
| 8,751,763 B1 | 6/2014 | Ramarao | |
| 8,819,367 B1 | 8/2014 | Fallone | |
| 8,825,937 B2 | 9/2014 | Atkisson | |
| 8,832,688 B2 | 9/2014 | Tang | |
| 8,868,825 B1 | 10/2014 | Hayes | |
| 8,904,061 B1 | 12/2014 | O'Brien, III | |
| 8,949,208 B1 | 2/2015 | Xu | |
| 9,015,561 B1 | 4/2015 | Hu | |
| 9,031,296 B2 | 5/2015 | Kaempfer | |
| 9,043,545 B2 | 5/2015 | Kimmel | |
| 9,088,300 B1 | 7/2015 | Chen | |
| 9,092,223 B1 | 7/2015 | Pani | |
| 9,129,628 B1 | 9/2015 | Fallone | |
| 9,141,176 B1 | 9/2015 | Chen | |
| 9,208,817 B1 | 12/2015 | Li | |
| 9,213,627 B2 | 12/2015 | Van Acht | |
| 9,280,472 B1 | 3/2016 | Dang | |
| 9,280,487 B2 | 3/2016 | Candelaria | |
| 9,311,939 B1 | 4/2016 | Malina | |
| 9,336,340 B1 | 5/2016 | Dong | |
| 9,436,595 B1 | 9/2016 | Benitez | |
| 9,495,263 B2 | 11/2016 | Pang | |
| 9,529,601 B1 | 12/2016 | Dharmadhikari | |
| 9,529,670 B2 | 12/2016 | O'Connor | |
| 9,575,982 B1 | 2/2017 | Sankara Subramanian | |
| 9,588,698 B1 | 3/2017 | Karamcheti | |
| 9,588,977 B1 | 3/2017 | Wang | |
| 9,607,631 B2 | 3/2017 | Rausch | |
| 9,671,971 B2 | 6/2017 | Trika | |
| 9,747,202 B1 | 8/2017 | Shaharabany | |
| 9,852,076 B1 | 12/2017 | Garg | |
| 9,875,053 B2 | 1/2018 | Frid | |
| 9,912,530 B2 | 3/2018 | Singatwaria | |
| 9,946,596 B2 | 4/2018 | Hashimoto | |
| 10,013,169 B2 | 7/2018 | Fisher | |
| 10,199,066 B1 | 2/2019 | Feldman | |
| 10,229,735 B1 | 3/2019 | Natarajan | |
| 10,235,198 B2 | 3/2019 | Qiu | |
| 10,268,390 B2 | 4/2019 | Warfield | |
| 10,318,467 B2 | 6/2019 | Barzik | |
| 10,361,722 B2 | 7/2019 | Lee | |
| 10,437,670 B1 | 10/2019 | Koltsidas | |
| 10,459,663 B2 | 10/2019 | Agombar | |
| 10,642,522 B2 | 5/2020 | Li | |
| 10,649,657 B2 | 5/2020 | Zaidman | |
| 10,678,432 B1 | 6/2020 | Dreier | |
| 10,756,816 B1 | 8/2020 | Dreier | |
| 10,928,847 B2 | 2/2021 | Suresh | |
| 11,023,150 B2* | 6/2021 | Pletka | G06F 3/0631 |
| 11,068,165 B2* | 7/2021 | Sharon | G06F 12/0246 |
| 11,138,124 B2* | 10/2021 | Tomic | G06F 3/0688 |
| 2001/0032324 A1 | 10/2001 | Slaughter | |
| 2002/0010783 A1 | 1/2002 | Primak | |
| 2002/0039260 A1 | 4/2002 | Kilmer | |
| 2002/0073358 A1 | 6/2002 | Atkinson | |
| 2002/0095403 A1 | 7/2002 | Chandrasekaran | |
| 2002/0112085 A1 | 8/2002 | Berg | |
| 2002/0161890 A1 | 10/2002 | Chen | |
| 2003/0074319 A1 | 4/2003 | Jaquette | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0066741 A1 | 4/2004 | Dinker | |
| 2004/0103238 A1 | 5/2004 | Avraham | |
| 2004/0143718 A1 | 7/2004 | Chen | |
| 2004/0255171 A1 | 12/2004 | Zimmer | |
| 2004/0267752 A1 | 12/2004 | Wong | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0138325 A1 | 6/2005 | Hofstee | |
| 2005/0144358 A1 | 6/2005 | Conley | |
| 2005/0149827 A1 | 7/2005 | Lambert | |
| 2005/0174670 A1 | 8/2005 | Dunn | |
| 2005/0177672 A1 | 8/2005 | Rao | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0031709 A1 | 2/2006 | Hiraiwa | |
| 2006/0101197 A1 | 5/2006 | Georgis | |
| 2006/0156012 A1 | 7/2006 | Beeson | |
| 2006/0184813 A1 | 8/2006 | Bui | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0250756 A1 | 10/2007 | Gower | |
| 2007/0266011 A1 | 11/2007 | Rohrs | |
| 2007/0283081 A1 | 12/2007 | Lasser | |
| 2007/0283104 A1 | 12/2007 | Wellwood | |
| 2007/0285980 A1 | 12/2007 | Shimizu | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0163033 A1 | 7/2008 | Yim | |
| 2008/0301532 A1 | 12/2008 | Uchikawa | |
| 2009/0006666 A1 | 1/2009 | Lin | |
| 2009/0089544 A1 | 4/2009 | Liu | |
| 2009/0110078 A1* | 4/2009 | Crinon | H04N 5/21 375/240.24 |
| 2009/0113219 A1 | 4/2009 | Aharonov | |
| 2009/0125788 A1 | 5/2009 | Wheeler | |
| 2009/0183052 A1 | 7/2009 | Kanno | |
| 2009/0254705 A1 | 10/2009 | Abali | |
| 2009/0282275 A1 | 11/2009 | Yermalayeu | |
| 2009/0287956 A1 | 11/2009 | Flynn | |
| 2009/0307249 A1 | 12/2009 | Koifman | |
| 2009/0307426 A1 | 12/2009 | Galloway | |
| 2009/0310412 A1 | 12/2009 | Jang | |

(56) References Cited

U.S. PATENT DOCUMENTS

| | | |
|---|---|---|
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0283140 A1* | 9/2016 | Kaushik ............... G06F 3/0685 |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |

(56) References Cited

U.S. PATENT DOCUMENTS

| | | |
|---|---|---|
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0361611 A1* | 11/2019 | Hosogi ............... G06F 3/0631 |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0082006 A1* | 3/2020 | Rupp ................ G06F 16/2282 |
| 2020/0089430 A1 | 3/2020 | Kanno |
| 2020/0097189 A1 | 3/2020 | Tao |
| 2020/0133841 A1* | 4/2020 | Davis ............... G06F 12/0246 |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348481 A1 | 11/2020 | Kim |
| 2020/0387327 A1 | 12/2020 | Hsieh |
| 2020/0401334 A1 | 12/2020 | Saxena |
| 2020/0409559 A1* | 12/2020 | Sharon ............... G06F 3/0673 |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |
| 2021/0124488 A1* | 4/2021 | Stoica .................. G06F 3/061 |

FOREIGN PATENT DOCUMENTS

| | | |
|---|---|---|
| WO | 9418634 | 8/1994 |
| WO | 1994018634 | 8/1994 |

OTHER PUBLICATIONS

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

(56) References Cited

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime, "Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

\* cited by examiner

METHOD AND SYSTEM FOR FACILITATING A PHYSICALLY ISOLATED STORAGE UNIT FOR MULTI-TENANCY VIRTUALIZATION

BACKGROUND

Field

This disclosure is generally related to the field of data storage. More specifically, this disclosure is related to a method and system for facilitating a physically isolated storage unit for multi-tenancy virtualization.

Related Art

Today, various storage systems are being used to store and access the ever-increasing amount of digital content. A storage system can include various storage devices which can provide persistent memory, e.g., a solid state drive (SSD) and a hard disk drive (HDD). A cloud service can provide access to a storage system by using virtualization, in which a single physical storage drive can be used by multiple virtual machines (VMs). When a single VM is destroyed, the system may physically remove all data corresponding to the single VM, e.g., to prevent subsequent access to the data associated with the single VM. The performance of the single physical drive may be required to be of sufficient reliability to eliminate tails associated with latency distribution. Furthermore, an accelerated recycling of physical space in the single physical storage drive may extend the usage of the storage drive, which can result in a revenue increase. Additionally, providing reliability in performance may be beneficial for fulfillment of service level agreements (SLAs).

One current virtualization method involves implementing the input/output (I/O) virtualization to provide logical drives for multiple VMs, using a single root I/O virtualization (SRIOV). This method can expose multiple virtual functions (VFs), which can be instantiated by different VMs to form the logical drives. However, this method can result in some constraints, e.g.: data and I/O from different VMs may be stored in the same NAND block or page, which can result in a time-consuming process for data destruction, and can also trigger garbage collection; I/Os from multiple VMs may be placed in a random layout across the physical storage drives, which can create difficulties in balancing the I/O performance among the multiple VMs; the I/O distribution may be spread randomly across the multiple physical storage drives, which can result in hot spots and a traffic imbalance; and a single storage drive may not provide data recovery protection among the multiple physical storage drives.

Thus, while the SRIOV method can provide logical drives for multiple VMs, the above-described constraints can result in a decrease in the efficiency and performance of the overall storage system.

SUMMARY

One embodiment provides a system which facilitates organization of data. During operation, the system allocates, to a function associated with a host, a number of block columns to obtain a physical storage space for the function, wherein a block column corresponds to a block from each of a plurality of dies of the non-volatile storage device. In response to processing an incoming host write instruction and an internal background write instruction, the system allocates a first block column to the incoming host write instruction and a second block column to the internal background write instruction, thereby extending a lifespan of the non-volatile storage device by recycling the first block column when deleting a namespace or virtual machine associated with the function.

In some embodiments, the function is a virtual function. In response to receiving a command to delete a virtual machine associated with the virtual function, the system erases the number of block columns of the physical storage space allocated for the virtual function and returns the number of block columns to a block column pool.

In some embodiments, allocating the number of block columns comprises obtaining the number of block columns from a block column pool.

In some embodiments, in response to receiving the incoming host write instruction, the system writes data associated with the host write to at least the first block column allocated to the function.

In some embodiments, the system identifies a sealed block column which is filled with data. The system executes the internal background write instruction as a garbage collection process based on the second block column, by: copying valid data from blocks of the sealed block column to blocks of the second block column; erasing data stored in the blocks of the sealed block column; and returning the sealed block column to a block column pool.

In some embodiments, the non-volatile storage device is one of a plurality of non-volatile storage devices which communicate with a global flash translation layer. The global flash translation layer allocates the number of block columns to the function, and the allocated block columns correspond to at least two of the non-volatile storage devices. The function is one of a plurality of virtual functions to which the global flash translation layer allocates block columns.

In some embodiments, the global flash translation layer maps each virtual function to an allocated physical storage space, and each physical storage space includes block columns corresponding to at least two of the non-volatile storage devices.

In some embodiments, an erasure coding (EC) encoding/decoding module in a controller performs EC encoding/decoding for the functions. Data associated with the function is stored in the allocated number of block columns across the at least two non-volatile storage devices. The system performs, by the EC encoding/decoding module, EC encoding on the data prior to the data being stored in the allocated number of block columns to obtain an EC codeword. The system distributes the EC codeword to be stored in block columns in the allocated number of block columns across the at least two non-volatile storage devices.

In some embodiments, the system divides a physical storage capacity of a non-volatile storage device into a plurality of block groups, wherein a block group comprises a plurality of block columns.

BRIEF DESCRIPTION OF THE FIGURES

In the figures, like reference numerals refer to the same figure elements.

DETAILED DESCRIPTION

Figure 1:
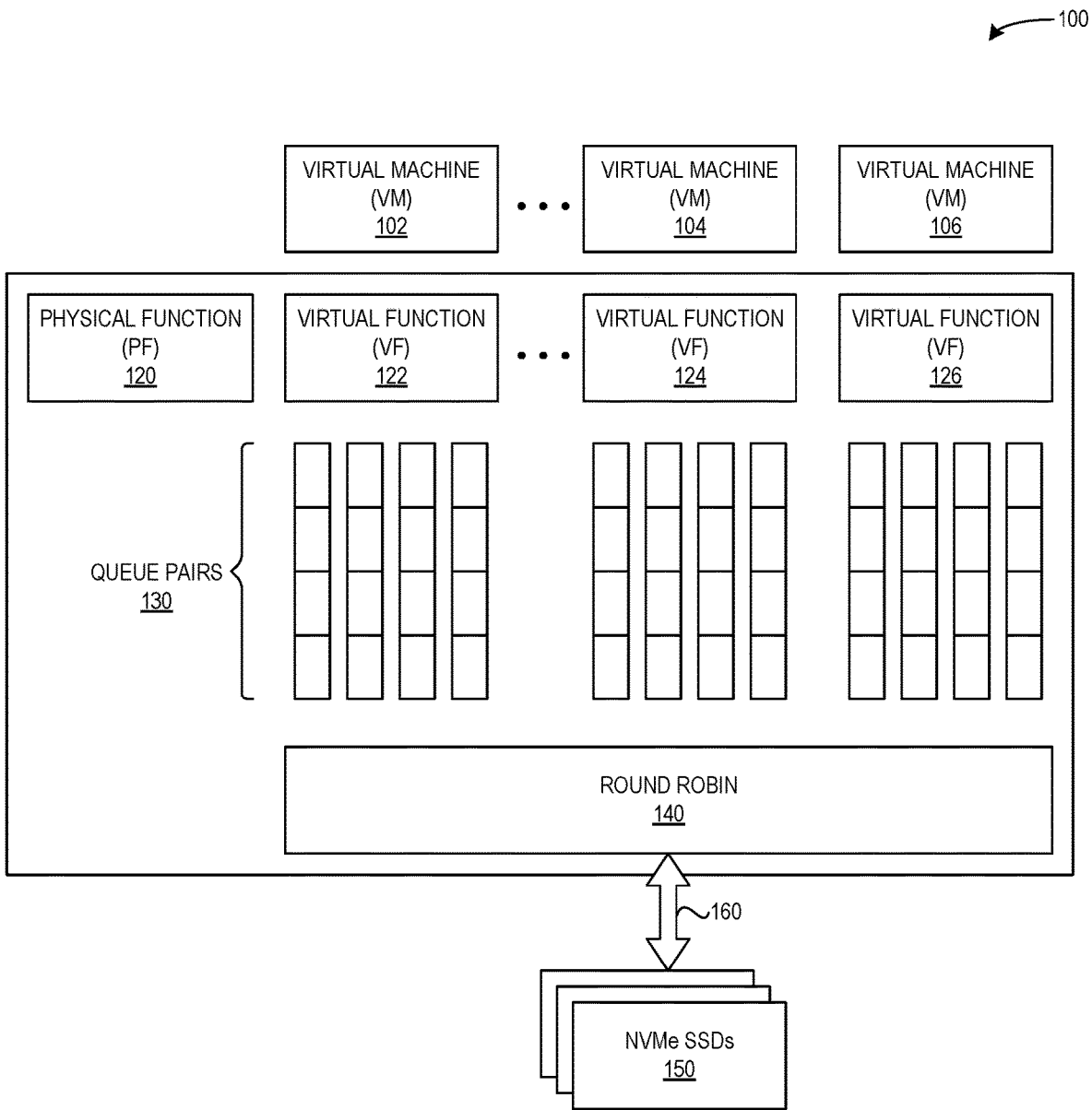
FIG. 1 illustrates an architecture of an exemplary virtualization in a system, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate multi-tenancy virtualization by using physically isolated storage spaces across multiple storage drives.

As described above, virtualization is a technology in which a single physical storage drive can be used by multiple virtual machines (VMs). When a single VM is destroyed, the system may physically remove all data corresponding to the single VM, e.g., to prevent subsequent access to the data associated with the single VM. The performance of the single physical drive may be required to be of sufficient reliability to eliminate tails associated with latency distribution. Furthermore, an accelerated recycling of physical space in the single physical storage drive may extend the usage of the storage drive, which can result in a revenue increase. Additionally, providing reliability in performance may be beneficial for fulfillment of service level agreements (SLAs).

One current virtualization method involves implementing the input/output (I/O) virtualization to provide logical drives for multiple VMs, using a single root I/O virtualization (SRIOV). This method can expose multiple virtual functions (VFs), which can be instantiated different VMs to form the logical drives. An exemplary system based on the SRIOV method is described below in relation to FIG. 1.

However, this method can result in some constraints, e.g.: data and I/O from different VMs may be stored in the same NAND block or page, which can result in a time-consuming process for data destruction, and can also trigger garbage collection; I/Os from multiple VMs may be placed in a random layout across the physical storage drives, which can create difficulties in balancing the I/O performance among the multiple VMs; the I/O distribution may be spread randomly across the multiple physical storage drives, which can result in hot spots and a traffic imbalance; and a single storage drive may not provide data recovery protection among the multiple physical storage drives. Thus, while the SRIOV method can provide logical drives for multiple VMs, the above-described constraints can result in a decrease in the efficiency and performance of the overall storage system.

The embodiments described herein address these issues by providing a system which divides the physical storage capacity of a non-volatile storage drive into block groups which include block columns, where each block column corresponds to a block from a die of the storage drive. For each virtual function (VF) associated with a host (e.g., an incoming host write instruction), the system can allocate a number of block columns, where the allocated number is based on requirements of a respective VF or its associated virtual machine (VM), as described below in relation to FIG. 2.

Figure 2:
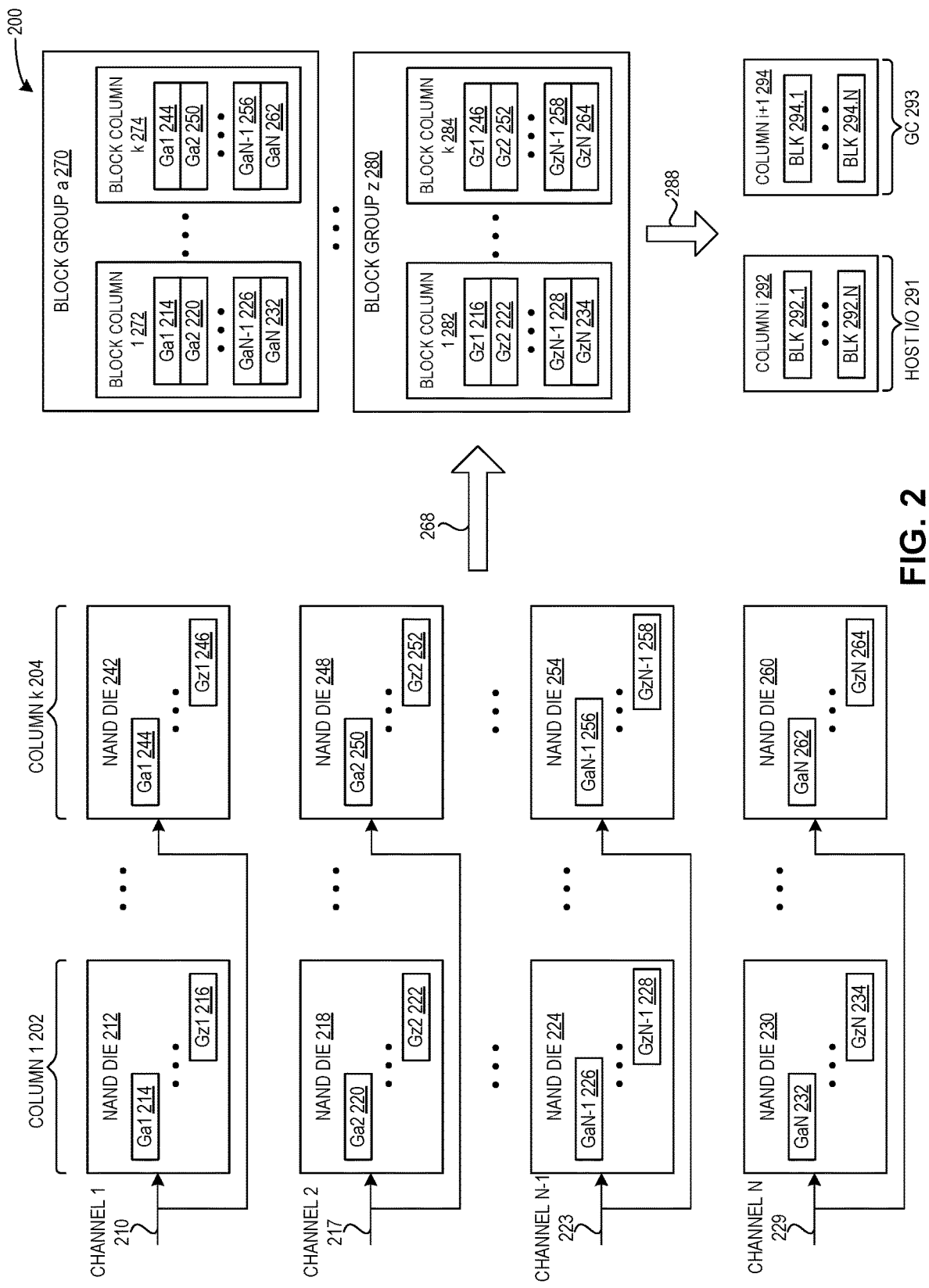
FIG. 2 illustrates physically isolated storage space based on the storage capacity divided into block groups which include block columns, in accordance with an embodiment of the present application.

Similar to this allocation of block columns in processing an incoming host write instruction, the system can also allocate block columns to an internal background write instruction, as described below in relation to FIGS. 2 and 3. This allows the data access to remain independent in the allocated block columns of a given physical storage space, while also allowing the background operations to occur within its allocated block columns of another given physical storage space.

Moreover, the division and organization of the physical storage media into the block columns can result in a more efficient destruction of data, which can accelerate the readiness of the physical storage media to provide service to other VMs, as described below in relation to FIGS. 3 and 4. The block columns allocated to a VF can be associated with dies in a single storage device or across multiple storage devices, as described below in relation to FIG. 5. In addition, the organization of the physical storage media can provide a flexible erasure coding process, which can result in improvement in the agility and flexibility of data protection in handling issues relating to random defect patterns.

Thus, by dividing and organizing the physical storage media into block columns which can be allocated to various host applications or VFs, and by allocating block columns to a host write instruction and an internal background write instruction, the described system can provide physically isolated storage spaces which can facilitate a more efficient multi-tenancy virtualization.

A "storage system infrastructure," "storage infrastructure," or "storage system" refers to the overall set of hardware and software components used to facilitate storage for a system. A storage system can include multiple clusters of storage servers and other servers. A "storage server" refers to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), or a flash-based storage device.

A "non-volatile storage device" refers to a computing device, entity, server, unit, or component which can store data in a persistent or a non-volatile memory. In the embodiments described herein, the non-volatile storage device is depicted as a solid state drive (SSD), which includes a plurality of dies which can be accessed over a plurality of channels, but other non-volatile storage devices can be used.

A "computing device" refers to any server, device, node, entity, drive, or any other entity which can provide any computing capabilities.

A physical storage capacity of a non-volatile storage device can be divided or organized into "block groups." A block group can include a plurality of "block columns." A block column can correspond to a block from each of a plurality of dies of the non-volatile storage device.

"Allocating" block columns to a function can also be referred to as "assigning," "mapping," or "associating" block columns to a function.

A "sealed block column" refers to a block column which is filled with data and in a state which is ready to be recycled. An "open block column" refers to a block column which includes pages which are available to be written to or programmed. An open block column can be associated with a host write instruction (e.g., block column 432 in FIG. 4) or with an internal background write instruction (e.g., block column 422 in FIG. 4).

A "virtual machine" or "VM" can be associated with a host, and a VM can instantiate a corresponding "virtual function" or "VF." The embodiments described herein refer to allocating block columns to a function associated with a host, and can also refer to allocating block columns to a virtual machine corresponding to the function, which can be a VF. Some references to a VF or VM may be described as "VF/VM" or "VM/VF."

Architecture of Exemplary Virtualization in a System in the Prior Art

FIG. 1 illustrates an architecture of virtualization in an exemplary system 100, in accordance with the prior art. System 100 can depict the single root I/O virtualization (SRIOV), which can expose multiple virtual functions (VFs). The VFs can be instantiated by different virtual machines (VMs) to form the logical drives. For example, system 100 can include multiple VMs, such as VMs 102, 104, and 106. Each VM can be associated with a VF: VM 102 can be associated with a VF 122; VM 104 can be associated with a VF 124; and VM 106 can be associated with a VF 126. System 100 can thus include logical drives, which can include a physical function (PF 120) and VFs 122, 124, and 126. System 100 can receive incoming I/O requests or data from VMs 102-106 (and via associated VFs 122-126), which requests/data can be processed by queue pairs 130. Queue pairs 130 can include submission queues (SQs) and completion queues (CQs). System 100 can input the I/O requests/data into a round robin module 140, which can subsequently transmit the I/O requests/data to non-volatile memory express (NVMe) SSDs 150 (via a communication 160). Based on the logical block addresses (LBAs) of the data, NVMe SSDs 150 may mix the data from different VMs together in a random manner.

The method depicted in conventional system 100 can result in some constraints. First, data and I/O from different VMs may be stored in the same NAND block or even NAND page, which can result in a time-consuming process for data destruction, and can also trigger garbage collection. The garbage collection is an internal background write operation which can result in interference with incoming write I/Os. Second, I/Os from multiple VMs may be placed in a random layout across the physical storage drives, which can create difficulties in balancing the I/O performance among the multiple VMs. Third, the distribution of the I/O may not be managed by one physical server for the multiple NVMe SSDs 150, and the usage of physical capacity on neighboring storage drives may differ greatly. Because the I/O distribution may be spread randomly across the multiple physical storage drives, this can result in hot spots and a traffic imbalance. Fourth, a single storage drive may not provide sufficient data recovery protection among the multiple physical storage drives.

Thus, while the SRIOV method can provide logical drives for multiple VMs, the above-described constraints can result in a decrease in the efficiency and performance of the overall storage system.

Physically Isolated Storage Units: Block Groups with Block Columns Across Multiple Dies FIG. 2 illustrates an exemplary environment 200 with physically isolated storage space based on the storage capacity divided into block groups which include block columns, in accordance with an embodiment of the present application. Environment 200 can include multiple channels, e.g., channels 1 210, 2 217, N−1 223, and N 229. Each channel can be associated with one or more NAND dies, and each NAND die can be accessed via a channel. For example: NAND dies 212 and 242 can be accessed via channel 1 210; NAND dies 218 and 248 can be accessed via channel 2 217; NAND dies 224 and 254 can be accessed via channel N−1 223; and NAND dies 230 and 260 can be accessed via channel N 229. In some embodiments, each channel can correspond to a single NAND die.

The system can divide or organize the physical space of the depicted NAND dies (i.e., 212, 218, 224, 230, 242, 248, 254, and 260) into a plurality of block groups, where a block group can include a plurality of block columns and where each block column corresponds to a block from each of a plurality of dies. The division or organization of the physical storage space of the storage media can be depicted by a communication 268. For example, a block group a 270 can include a block column 1 272 and a block column k 274. Block column 1 272 can correspond to the following blocks: block group a ("Ga"), block 1 (i.e., "Ga1") 214 of NAND die 212; Ga2 220 of NAND die 218; GaN−1 226 of NAND die 224; and GaN 232 of NAND die 230. Similarly, block column k 274 can corresponding to the following blocks: block group z ("Gz"), block 1 (i.e., "Gz1") 216 of NAND die 212; Gz2 222 of NAND die 218; GzN−1 228 of NAND die 224; and GzN 234 of NAND die 230. Thus, each of the 1 through k block columns of block group a 270 can include N number of blocks from N number of NAND dies. Furthermore, the system can divide or organize the storage space of the physical storage media into a plurality of block groups, e.g., block group a 270 through block group z 280. Similar to block group a 270, block group z 280 can include 1 through k number of block columns, where each block column correspond to blocks from NAND dies 1-N.

Each block column can be considered a physical storage space, and the system can allocate a certain number of block columns from the same or different block groups to a certain host, application, virtual function, or virtual machine associated with a host, e.g., in handling an incoming host I/O or write instruction. The depicted block groups with the corresponding block columns can thus form a physically isolated storage space. Any number of block columns from any number of block groups can also form a physical isolated storage space. For example, the NAND blocks from Ga1 to GaN from N different NAND dies on the N channels can form block column 1 272 of block group a 270. The system may allocate each block column only to one VF/VM, and can also allocate multiple block columns to one VF/VM. The system can allocate multiple block columns for multiple VFs/VMs in parallel. Moreover, the system can allocate block columns from the same block group or from different block groups. That is, the allocated block columns may or may not be associated with the same block group.

While processing the incoming host I/O or write instruction, the system can also perform background write instructions by using the physically isolated storage spaces. For example, in a communication 288, the system can "pair" two different types of block columns. The system can allocate a host I/O instruction (and its corresponding VF/VM) to a column i 292, which corresponds to blocks 292.1 to 292.N. The system can also allocate a garbage collection ("GC") process 293 (i.e., an internal background write instruction) to a column i+1 294. While environment 200 depicts the allocated pair of block columns as neighboring or sequential (i and i+1) and in a 1-to-1 ratio, the system can allocate any two block columns to these two different processes, and the ratio of allocated blocks can be any ratio other than 1-to-1. Different scenarios of application and system usage may result in various combinations (i.e., ratios) in the allocation of host I/O block columns (e.g., as allocated to host I/O 291) and background write block columns (e.g., as allocated to GC 293).

Exemplary Environment for Virtualization and Block Column Allocation

Figure 3:
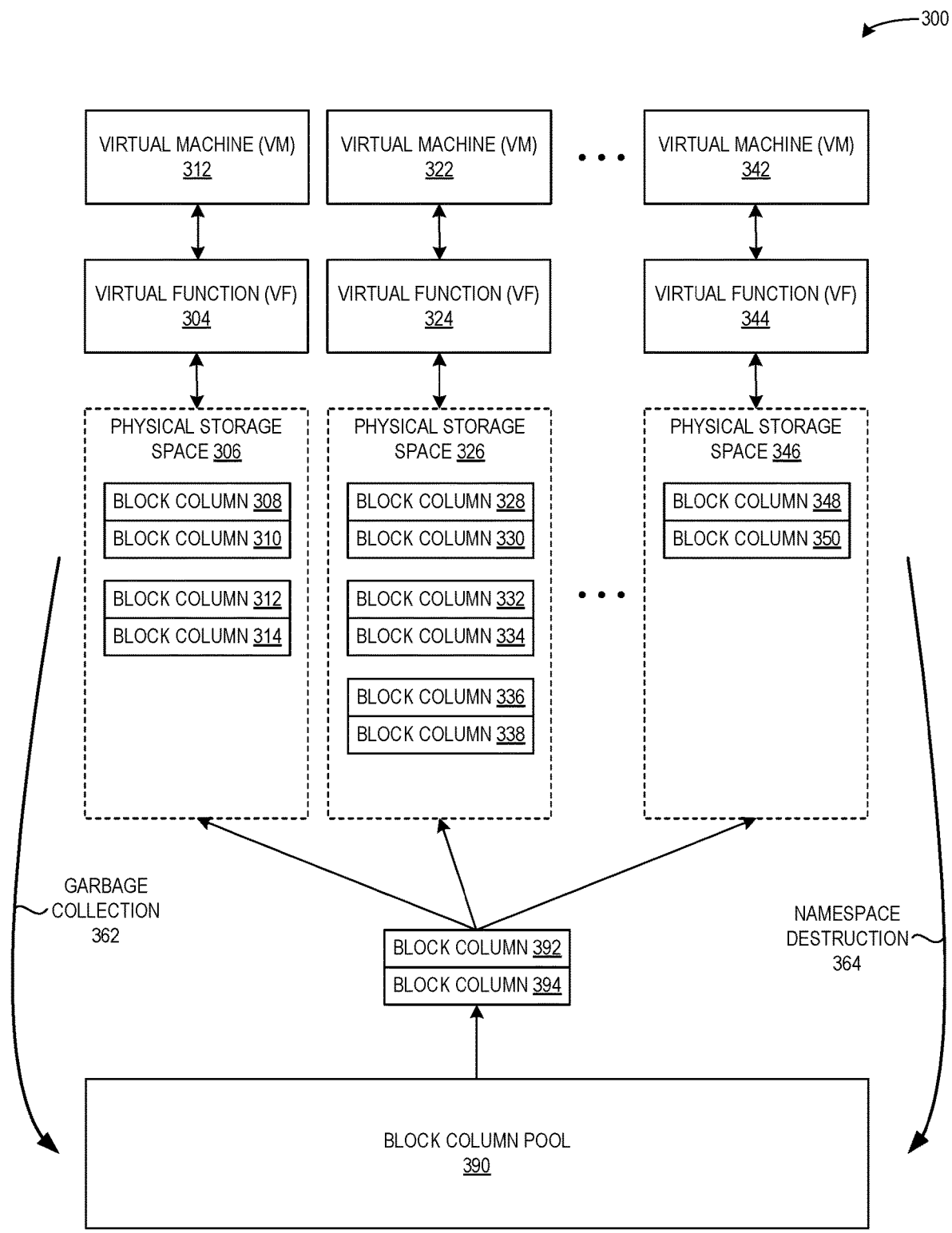
FIG. 3 illustrates an exemplary environment for virtualization and allocation of block columns from a block column pool, in accordance with an embodiment of the present application.

FIG. 3 illustrates an exemplary environment 300 for virtualization and allocation of block columns from a block column pool, in accordance with an embodiment of the present application. Environment 300 can include a plurality of virtual machines (VMs) 312, 322, and 342, which correspond, respectively, to virtual functions (VFs) 304, 324, and 344. As described above in relation to FIG. 2, the system can allocate a physical storage space to each VF, where the physical storage space is associated with a number of block columns of the physical storage capacity of a non-volatile storage device. Thus, one physical storage space can include a plurality of block columns and can serve only one VM via a corresponding VF.

The system can allocate block columns to each VF based on various conditions, including but not limited to: a size of incoming data associated with a VF/VM; a demand of the VM; a requested capacity, bandwidth, storage capacity, or other factor associated with and received from the VM; any performance, latency, or bandwidth requirements associated with a VF/VM; a historical, current, or predicted amount of physical storage space required by a VF/VM; and any other factor which can affect the amount of physical storage space required by a VF/VM. Each physical storage space can thus be a flexible domain with a variable number of block columns based on these exemplary factors and the utilization of a given VM. The system can dynamically allocate block columns to a VM/VF based on these factors, and can also adjust the allocated number of block columns based on these factors and other real-time factors or conditions detected, determined, or monitored by the system.

When the system receives incoming new data to be stored in the non-volatile storage device, or when certain background operations result in moving data to a new block column, the system can allocate a free block column (e.g., with all data erased) from a block column pool 390. The system can allocate the block columns to each VF from block column pool 390, as shown by block columns 392 and 394. For example: the system can allocate, from block column pool 390, block columns 308, 310, 312, and 314 to obtain a physical storage space 306 for VF 304; the system can allocate, from block column 390, block columns 328, 330, 332, 334, 336, and 338 to obtain a physical storage space 326 for VF 324; and the system can allocate, from block column pool 390, block columns 348 and 350 to obtain a physical storage space 346 for VF 344.

Furthermore, the system can perform a garbage collection process 362 on an identified block column, and upon recycling and erasing the data in the blocks corresponding to the identified block column, the system can return the recycled block column back to block column pool 390 for future use. Similarly, the system can perform a namespace destruction 364, which can involve removing a VM and deleting all data associated with the VM. Upon deleting the data in the blocks of all the block columns associated with the given namespace (i.e., all data associated with a given VM that is stored in the allocated block columns of a physical storage space for the given VM), the system can also return those block columns back to block column pool 390 for future use. Because each physical storage space contains only data corresponding to its given VM (and does not contain any data corresponding to other VMs), all of the data associated with a given VM is stored in its respective physical storage space, which eliminates the need to implement a garbage collection process on the respective physical storage space or on any other physical storage spaces. This is an improvement over the conventional system, in which overprovisioned space can result in more complicated data erasure procedures due to the data being scattered in various locations in the physical storage media (as depicted above in relation to the prior art environment of FIG. 1).

Exemplary Block Columns while Processing Incoming Host Write and Internal Background Process As described above in relation to FIG. 3, all the data associated with a given VM is stored in its corresponding physically isolated storage space, which includes block columns corresponding to blocks from a plurality of dies via a plurality of channels. This can result in a decreased interference among the multiple VMs when handling I/O access. Indeed, in a given physical storage space, the system can process and perform both an incoming host write instruction and an internal background write instruction (such as a garbage collection procedure) in parallel, or at the same or a similar time, which can reduce the interference caused by an internal background write in the conventional system, as described above in relation to FIG. 1.

Figure 4:
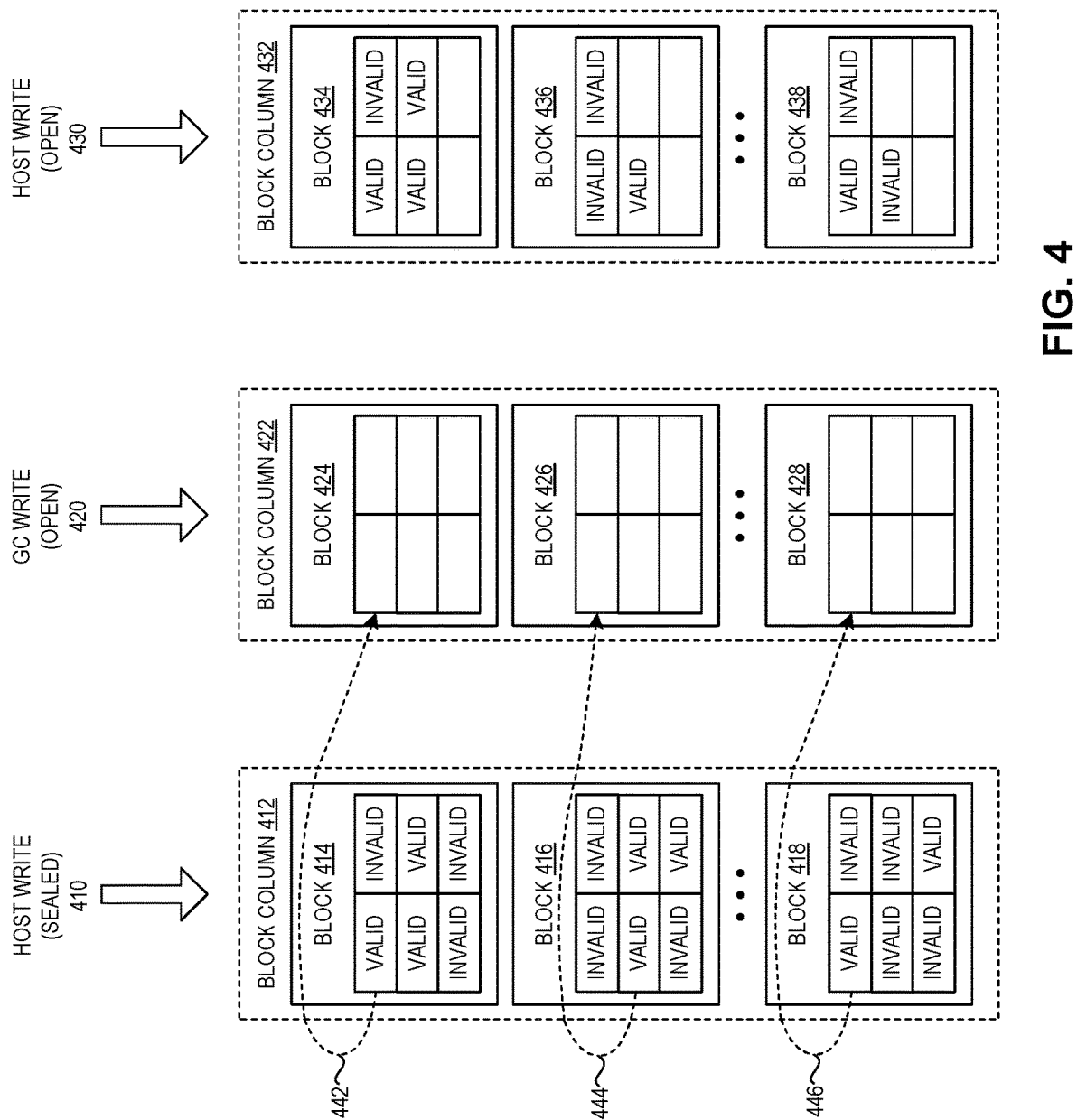
FIG. 4 illustrates three exemplary block columns, including a sealed block column for a host write, an open block column for a host write, and an open block column for a garbage collection process, in accordance with an embodiment of the present application.

FIG. 4 illustrates three exemplary block columns, including a sealed block column 412 for a host write, an open block column 432 for a host write, and an open block column 422 for a garbage collection process, in accordance with an embodiment of the present application. Block column 412 can include blocks 414, 416, and 418, where each block can include a mixture of valid and invalid data pages. Block column 412 can be a sealed block column which includes data programmed in all pages via a host write 410, where block column 412 is subsequently marked as "sealed." Block column 422 can include blocks 424, 426, and 428, where each block can include available pages (indicated with a blank cell) to which data can be written, as part of an internal background write instruction, e.g., a garbage collection write. Block column 422 can be an open block column which includes pages which can be programmed via a GC write 420. Block column 432 can include blocks 434, 436, and 438, where each block can include both programmed data (marked either as valid or invalid) and available pages (indicated with a blank cell). Block column 432 can be an open block column which includes pages available to be programmed via a host write 430. Sealed block column 412 associated with a host write instruction and open block column 432 associated with a host write instruction can both correspond to column i 292 for host I/O 291 as depicted in FIG. 2. Open block column 432 associated with a garbage collection write instruction can correspond to column i+1 294 for garbage collection 293.

During operation, the system can identify block column 412 with all pages programmed as a block column to be marked as a sealed block column, and the system can seal identified block column 412. The system can execute an internal background write instruction (e.g., a garbage collection process) based on block column 422 (associated with GC write 420). The system can copy valid data from blocks 414-418 of sealed block column 412 to available blocks 424-428 of open block column 422 (via, e.g., communications 442, 444, and 446). The system can erase the data stored in blocks 414-418 of sealed block column 412, and can return sealed block column 412 back to a block column pool (not shown in FIG. 4; as depicted by block column pool 390 of FIG. 3). At the same time, the system can receive and place incoming host data into open block column 432 (associated with host write 430).

In addition, the system may seal an open block upon detecting or based upon a certain condition, e.g., detecting that no data has been programmed or written to an open block within a predetermined time interval or period, and determining that the amount of data stored in the blocks of a block column is greater than a predetermined threshold.

Mapping of Virtual Functions to Block Columns Across Storage Devices

When the capacity of a single storage drive is divided into several physically isolated storage spaces (as described above), one challenge may be the upper limit of a physical capacity which may be obtained by a single VM. One solution for overcoming such a fixed upper limit is to extend the physical storage space associated with or allocated to a VM by distributing the physical storage spaces across multiple storage devices.

Figure 5:
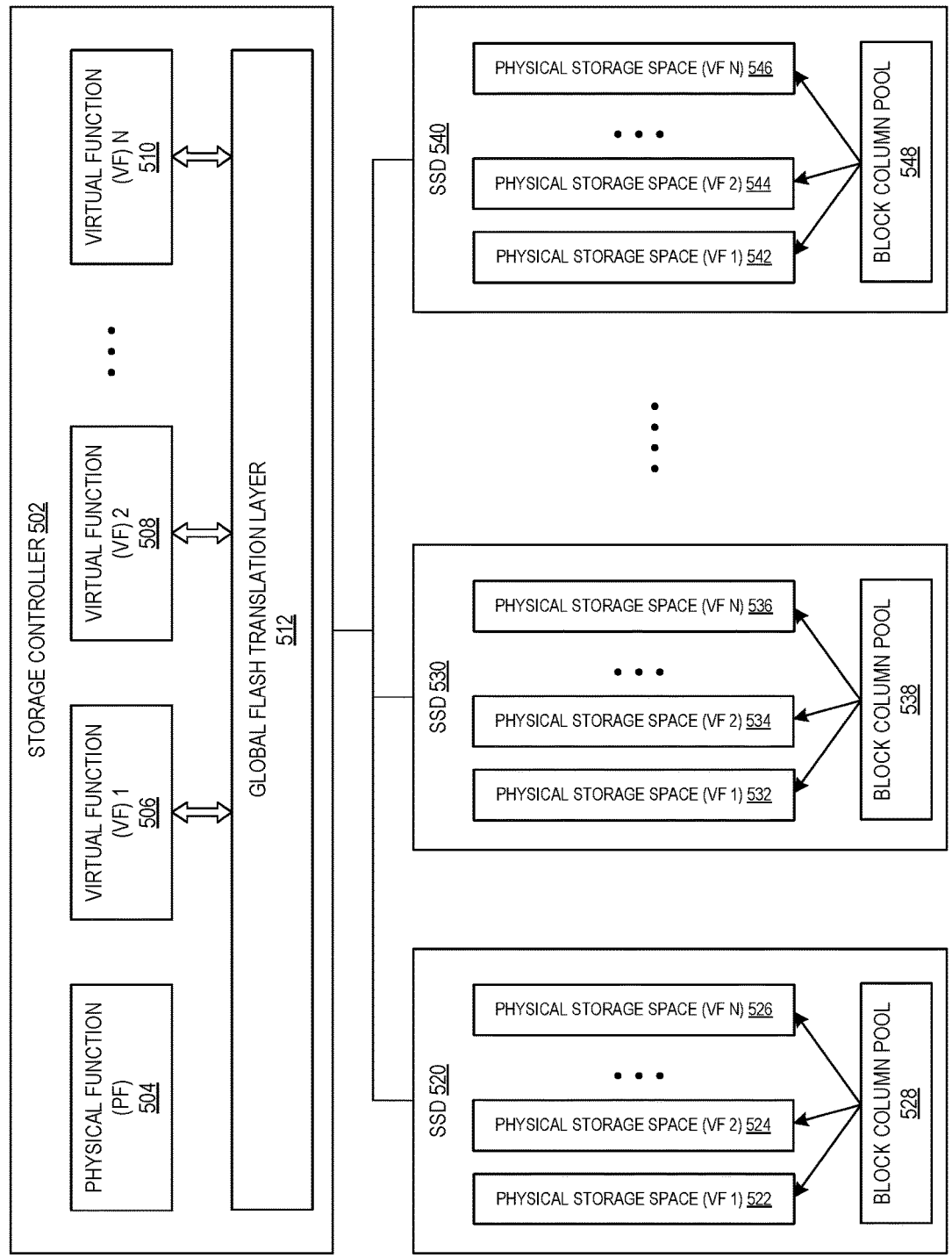
FIG. 5 illustrates an exemplary storage controller with a global flash translation layer module which maps virtual functions to block columns from at least two storage devices, in accordance with an embodiment of the present application.

FIG. 5 illustrates an exemplary storage controller 502 with a global flash translation layer module 512 which maps virtual functions 1 506, 2 508, and N 510 to block columns from at least two storage devices, such as SSDs 520, 530, and 540, in accordance with an embodiment of the present application. Storage controller 502 can also include a physical function (PF) 504 which may be associated with VFs 1 506-N 510. Each storage device can include a block column pool and a plurality of allocated physical storages spaces which each correspond to a VF. For example, SSD 520 can include a block column pool 528, from which the system can allocate block columns to various physical storage spaces for a respective VF, such as a physical storage space (for VF 1) 522, a physical storage space (for VF 2) 524, and a physical storage space (for VF N) 526. Similarly, SSD 530 can include a block column pool 538, from which the system can allocate block columns to various physical storage spaces for a respective VF, such as a physical storage space (for VF 1) 532, a physical storage space (for VF 2) 534, and a physical storage space (for VF N) 536. Additionally, SSD 540 can include a block column pool 548, from which the system can allocate block columns to various physical storage spaces for a respective VF, such as a physical storage space (for VF 1) 542, a physical storage space (for VF 2) 544, and a physical storage space (for VF N) 546. Thus, the physical storage space allocated to each VF can include physical storage space across multiple SSDs. For example, using global flash translation layer 512, the system can allocate, for VF 1, the following three physical storage spaces across three different SSDs: physical storage space 522 in SSD 520; physical storage space 532 in SSD 530; and physical storage space 542 in SSD 540. Global flash translation layer 512 can store a mapping of the plurality of allocated physical storage spaces to a respective virtual function (e.g., a mapping of physical storage spaces 522, 532, and 542 to VF 1 506).

Furthermore, each SSD can implement its own block column pool, and global flash translation layer 512 can collectively manage all of block column pools 528, 538, and 548 from, respectively, each of SSDs 520, 530, and 540. In some embodiments, global flash translation layer 512 can implement the block column pools for each SSD.

Exemplary Erasure Code Encoding

The system can provide a further improvement to the efficiency of the utilization of the physical storage capacity and the reliability of the data by protecting the blocks of data in a physical storage space with erasure coding. If a single storage drive is defective, the number of NAND blocks in that single storage drive should be less than the recovery strength of the erasure keyword. In other words, the constraint is that the number of NAND blocks in a single SSD which belong to a single EC group is less than the maximum recovery capability of the EC codeword. Otherwise, if that single SSD fails, the system cannot recover the data on that single SSD.

For example, given one (n,k) erasure coding scheme, the system can maximally tolerate the failure of n-k blocks. That is, the number of NAND blocks in a single storage drive which belong to the same allocated physical storage space must be less than n-k. If the entire storage drive fails, the system can still perform an EC-based recovery of the data. This can result in a more powerful and flexible protection for data recovery, as compared to the traditional or conventional RAID process. In the embodiments described herein, each EC group can allow the maximum n-k defective blocks at random locations within the respective EC group. This can result in an extension of the capacity, and can further spread the I/O access across the multiple drives while constructing a powerful EC protection, as described below in relation to FIG. 6.

Figure 6:
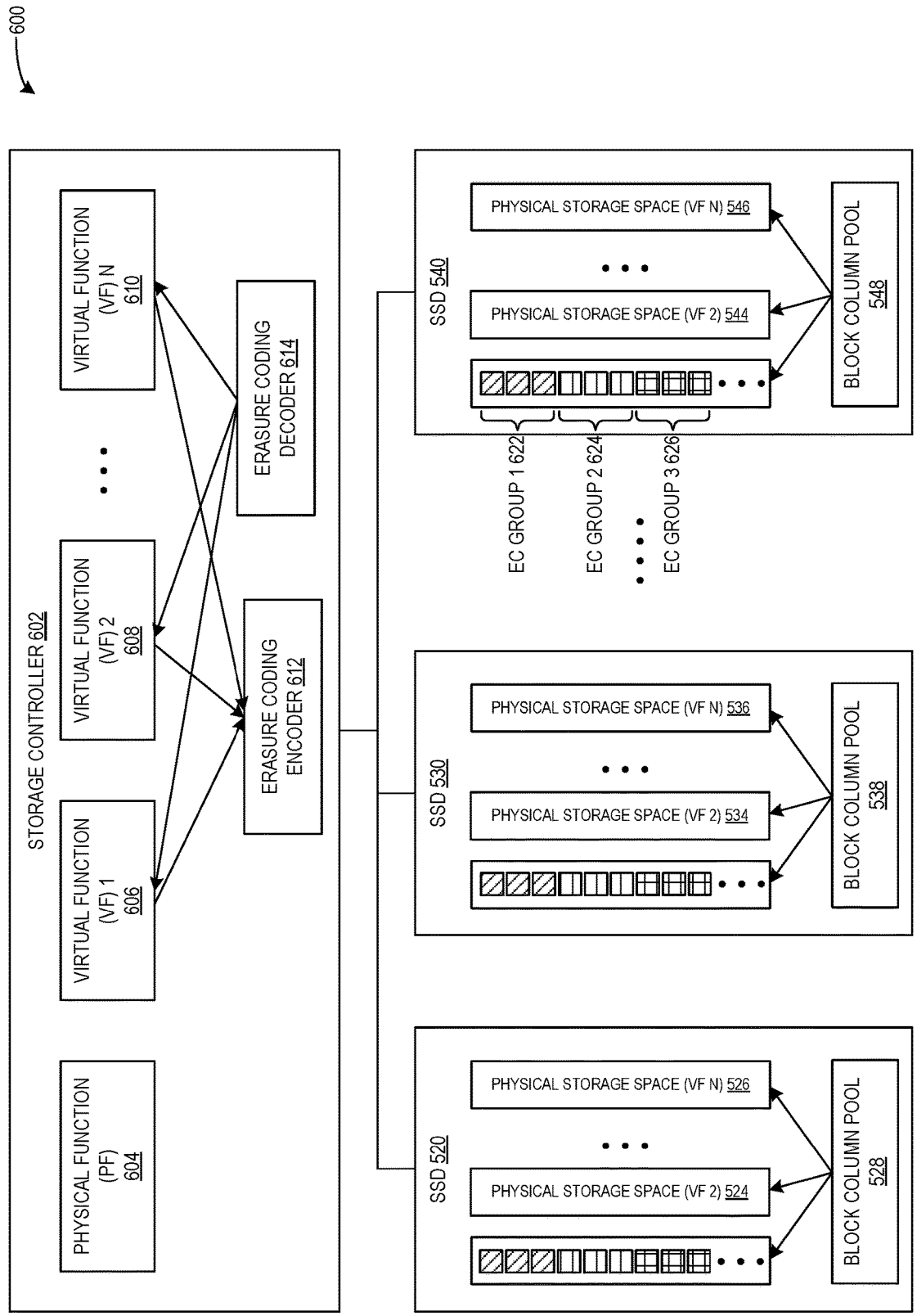
FIG. 6 illustrates an exemplary environment for erasure code (EC) encoding in a physical storage space, in accordance with an embodiment of the present application.

FIG. 6 illustrates an exemplary environment 600 for erasure code (EC) encoding in a physical storage space, in accordance with an embodiment of the present application. Environment 600 can include a storage controller 602 with a global flash translation layer module (not shown) which maps virtual functions 1 606, 2 608, and N 610 to block columns from at least two storage devices, such as SSDs 520, 530, and 540, in accordance with an embodiment of the present application. Storage controller 602 can also include a physical function (PF) 604 which may be associated with VFs 1 506-N 510. As in FIG. 5, each storage device can include a block column pool and a plurality of allocated physical storages spaces which correspond to a VF.

Storage controller 602 can also include an erasure coding (EC) encoder module 612 and an erasure coding (EC) decoder module 614. During operation, the system can allocate block columns from at least two of SSDs 520-540 to each VF. EC encoder 612 can perform EC encoding on data received from or associated with each VF, e.g., VF 1 606. The system can write the EC-encoded data to block columns which belong to the physical storage spaces allocated to VF 1 (i.e., physical storage spaces 522, 532, and 542), which results in the EC-encoded data spread out in multiple groups across the SSDs. That is, the system can write the EC-encoded data as EC groups across the SSDs. For example, an EC group 1 622 can be indicated with right-slanting diagonal lines, and can be stored across SSDs 520, 530, and 540. Similarly, an EC group 2 624 can be indicated with vertical lines, and can be stored similarly in SSDs 520, 530, and 540. Finally, an EC group 3 626 can be indicated with a cross-hatch pattern, and can be stored similarly in SSDs 520, 530, and 540. Thus, distributing the EC groups across the plurality of SSDs in the corresponding physical storage spaces allocated to a certain VF can result in an improvement in capacity extension and data protection.

Exemplary Method for Facilitating Organization of Data

Figure 7A:
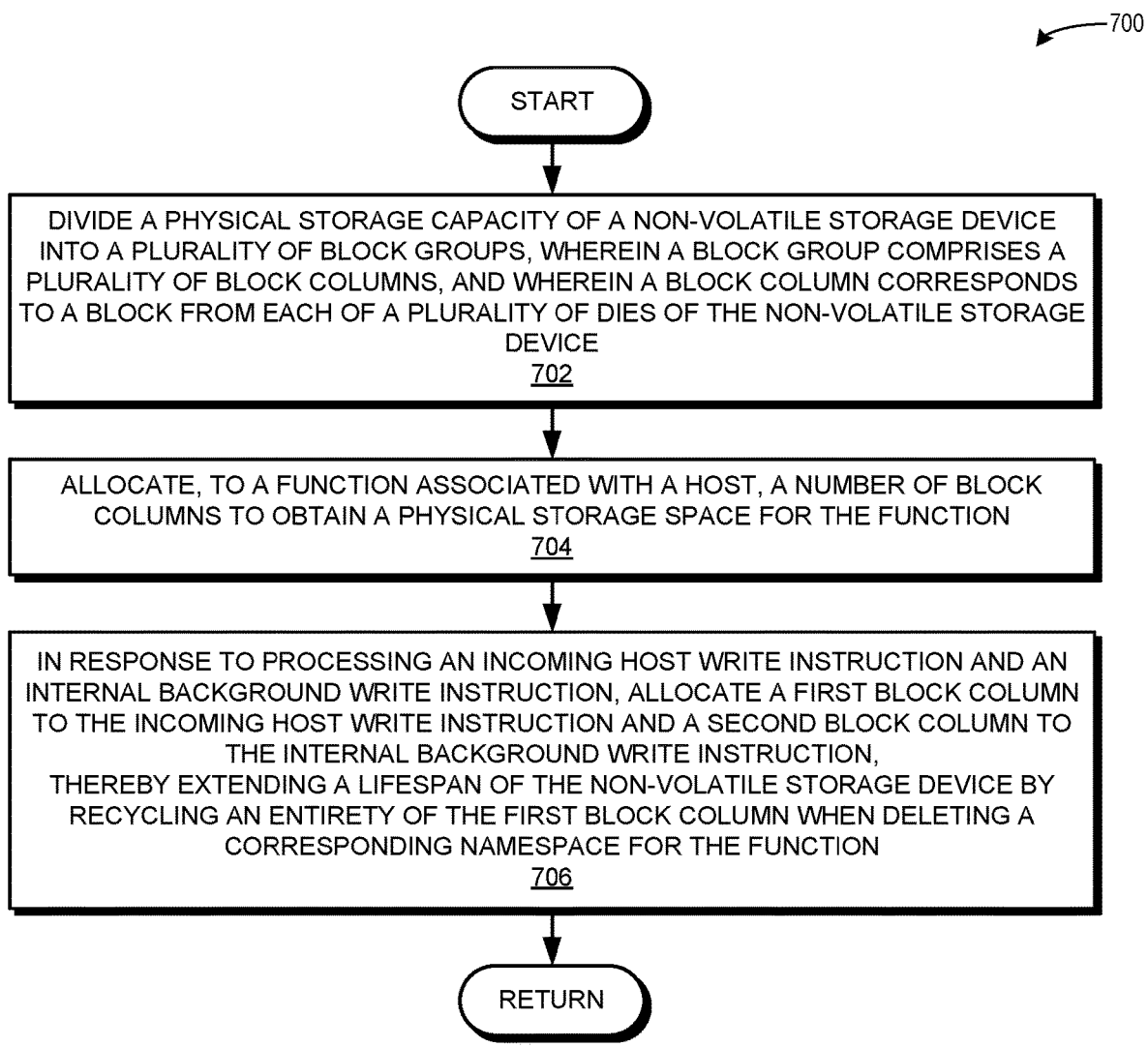
FIG. 7A presents a flowchart illustrating a method for facilitating organization of data, in accordance with an embodiment of the present application.

FIG. 7A presents a flowchart 700 illustrating a method for facilitating organization of data, in accordance with an embodiment of the present application. During operation, the system divides a physical storage capacity of a non-volatile storage device into a plurality of block groups, wherein a block group comprises a plurality of block columns, and wherein a block column corresponds to a block from each of a plurality of dies of the non-volatile storage device (operation 702). The system allocates, to a function associated with a host, a number of block columns to obtain a physical storage space for the function (operation 704). In some embodiments, the system can pre-configure the physical storage capacity of the non-volatile storage device by dividing the physical storage capacity into the block groups. That is, allocating the number of block columns to the host-associated function may or may not be immediately responsive to (i.e., may or may not occur immediately after) the configuration of the physical storage media of the non-volatile storage device. In response to processing an incoming host write instruction and an internal background write instruction, the system allocates a first block column to the incoming host write instruction and a second block column to the internal background write instruction, thereby extending a lifespan of the non-volatile storage device by recycling the first block column when deleting a corresponding namespace for the function (operation 706), and the operation returns.

Figure 7B:
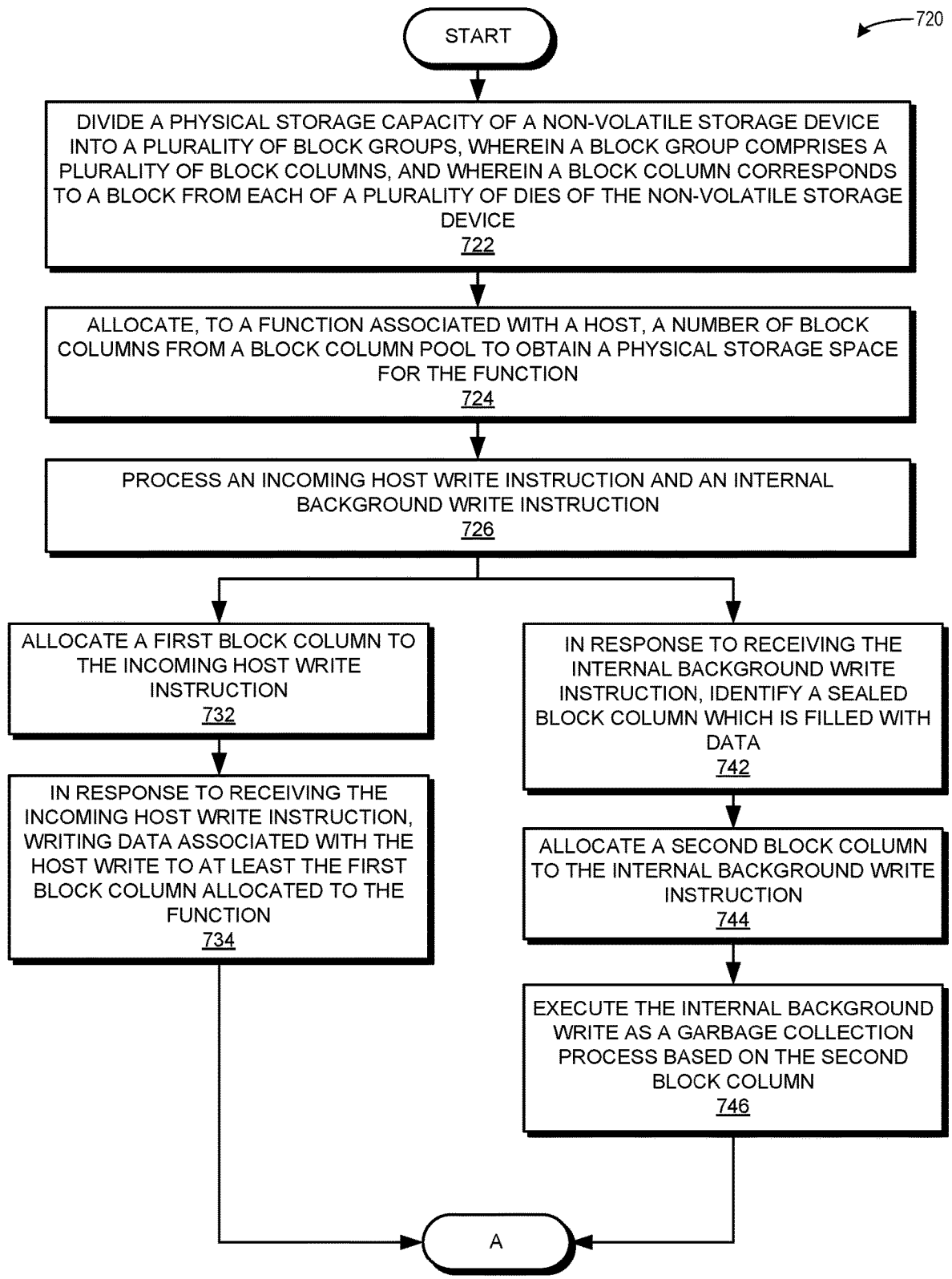
FIG. 7B presents a flowchart illustrating a method for facilitating organization of data, in accordance with an embodiment of the present application.

FIG. 7B presents a flowchart 720 illustrating a method for facilitating organization of data, in accordance with an embodiment of the present application. During operation, the system divides a physical storage capacity of a non-volatile storage device into a plurality of block groups, wherein a block group comprises a plurality of block columns, and wherein a block column corresponds to a block from each of a plurality of dies of the non-volatile storage device (operation 722). The system allocates, to a function associated with a host, a number of block columns to obtain a physical storage space for the function (operation 724). The system processes an incoming host write instruction and an internal background write instruction (operation 726).

In processing the incoming host write instruction, the system allocates a first block column to the incoming host write instruction (operation 732). In response to receiving the incoming host write instruction, the system writes data associated with the host write instruction to at least the first block column allocated to the function (operation 734). In processing the internal background write instruction, in response to receiving the internal background write operation, the system identifies a sealed block column which is filled with data (operation 742). The system allocates a second block column to the internal background write instruction (operation 744). The system executes the internal background write instruction as a garbage collection process based on the second block column (operation 746). To execute the garbage collection process, the system can copy valid data from blocks of the sealed block column to blocks of the second block column, erase data stored in the blocks of the sealed block column, and return the sealed block column to the block column pool (not shown).

Figure 7C:
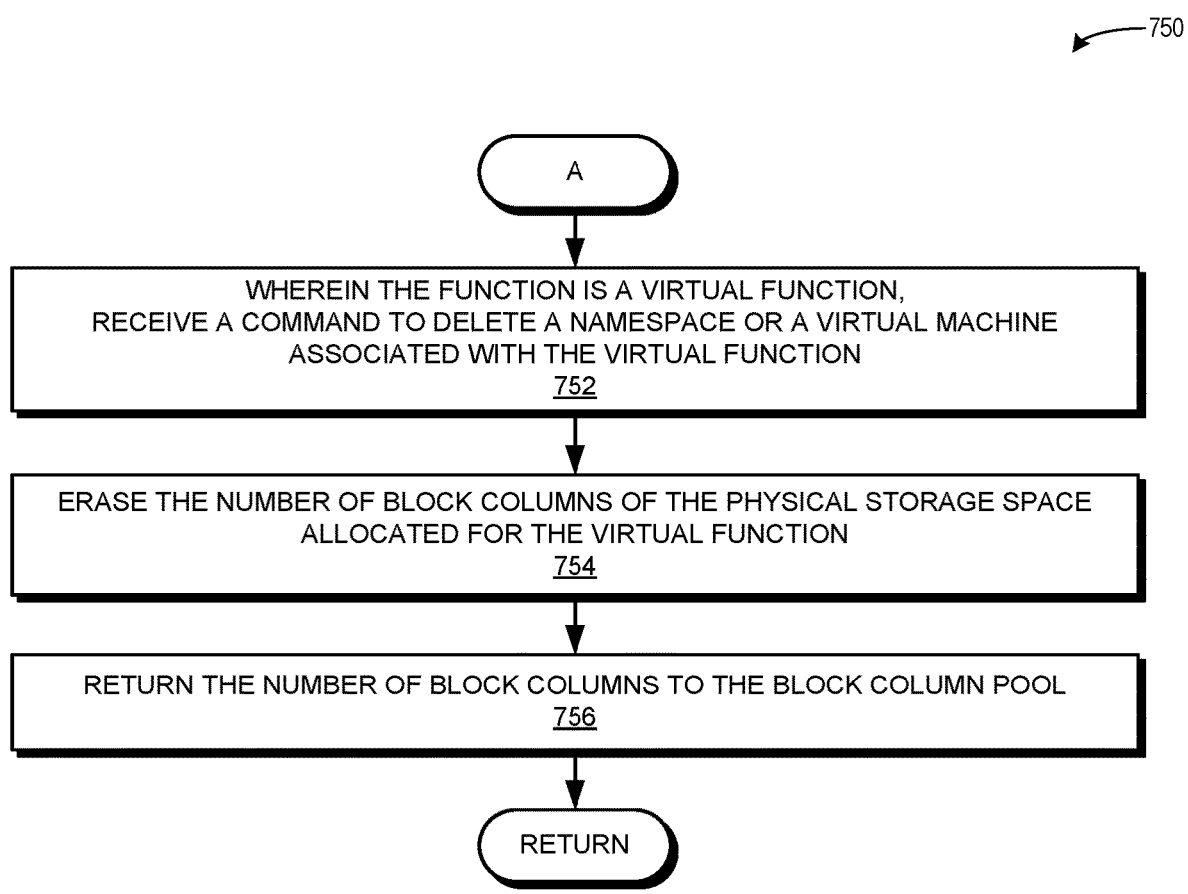
FIG. 7C presents a flowchart illustrating a method for facilitating organization of data, in accordance with an embodiment of the present application.

FIG. 7C presents a flowchart 750 illustrating a method for facilitating organization of data, in accordance with an embodiment of the present application. The function is a virtual function, and during operation, the system receives a command to delete a namespace or a virtual machine associated with the virtual function (operation 752). The system can erase the number of block columns of the physical storage space allocated for the virtual function (operation 754), and return the number of block columns to the block column pool (operation 756).

Exemplary Computer System and Apparatus

Figure 8:
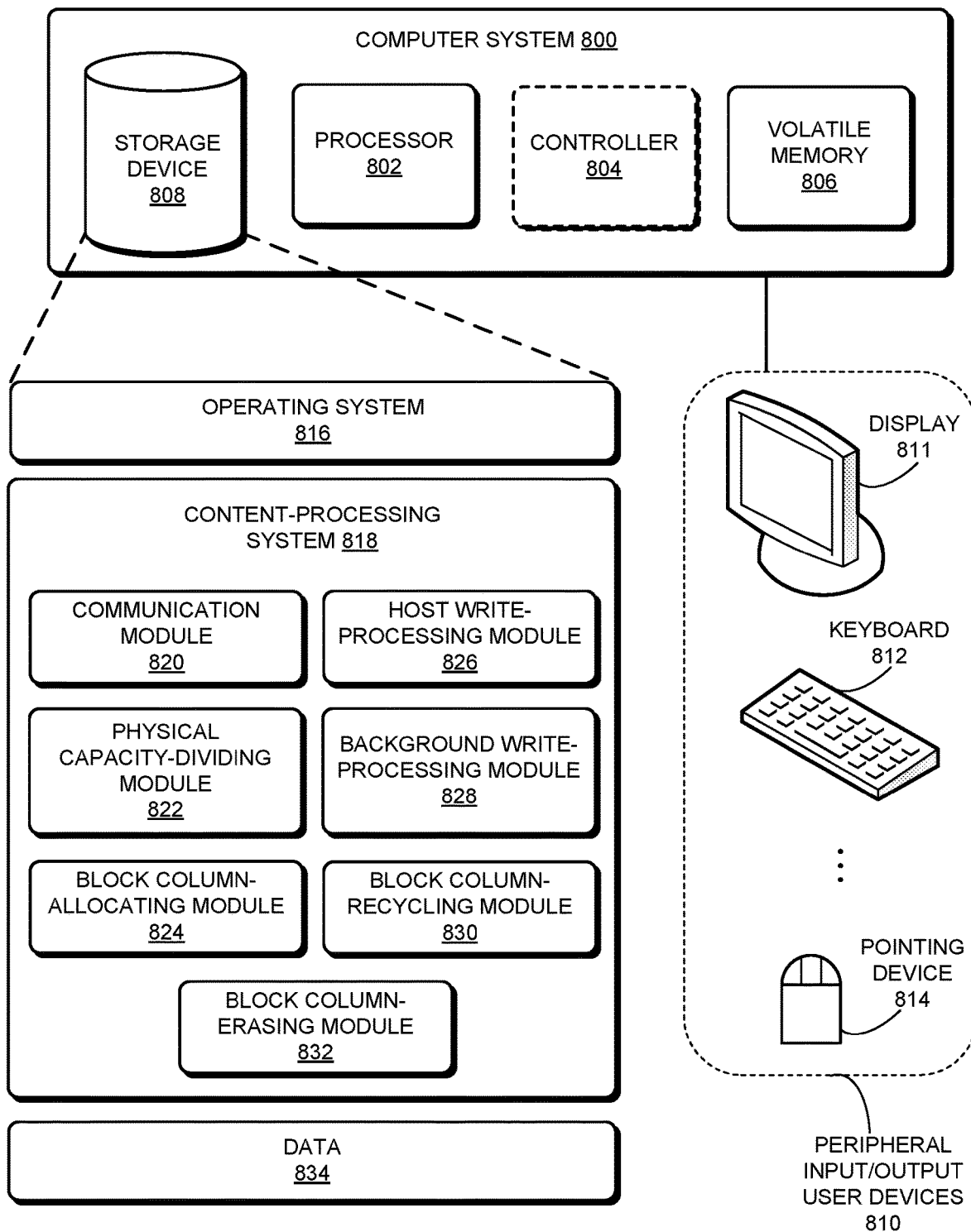
FIG. 8 illustrates an exemplary computer system that facilitates organization of data, in accordance with an embodiment of the present application.

FIG. 8 illustrates an exemplary computer system 800 that facilitates organization of data, in accordance with an embodiment of the present application. Computer system 800 includes a processor 802, a volatile memory 806, and a storage device 808. In some embodiments, computer system 800 can include a controller 804 (indicated by the dashed lines). Volatile memory 806 can include, e.g., random access memory (RAM), that serves as a managed memory, and can be used to store one or more memory pools. Storage device 808 can include persistent storage which can be managed or accessed via processor 802 (or controller 804). Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 834.

Content-processing system 818 can include instructions, which when executed by computer system 800, can cause computer system 800 or processor 802 to perform methods and/or processes described in this disclosure. Specifically, content-processing system 818 can include instructions for receiving and transmitting data packets, including data to be read or written, an input/output (I/O) request (e.g., a read request or a write request), metadata, a logical block address (LBA), a physical block address (PBA), and an indicator of a VF, a VM, a block group, a block column, or a block (communication module 820).

Content-processing system 818 can include instructions for dividing a physical storage capacity of a non-volatile storage device into a plurality of block groups, wherein a block group comprises a plurality of block columns, and wherein a block column corresponds to a block from each of a plurality of dies of the non-volatile storage device (physical capacity-dividing module 822). Content-processing system 818 can include instructions for allocating, to a function associated with a host, a number of block columns to obtain a physical storage space for the function (block column-allocating module 824). Content-processing system 818 can include instructions for, in response to processing an incoming host write instruction and an internal background write instruction (host write-processing module 826 and background write-processing module 828), allocating a first block column to the incoming host write instruction and a second block column to the internal background write instruction (block column-allocating module 824).

Content-processing system 818 can include instructions for, in response to receiving a command to delete a namespace or virtual machine associated with the virtual function (block column-recycling module 830 and block column-erasing module 832): erasing the number of block columns of the physical storage space allocated for the virtual function (block column-erasing module 832); and returning the number of block columns to the block column pool (block column-allocating module 824).

Data 834 can include any data that is required as input or generated as output by the methods and/or processes described in this disclosure. Specifically, data 834 can store at least: data; a request; a logical block address (LBA); a physical block address (PBA); a mapping between a virtual machine (VM) and a virtual function (VF); a mapping between a VM and one or more physical storage spaces; an indicator of a physical storage space which includes a number of block columns; an indicator of a block group(s) or block column(s) which have been allocated to a given VM or corresponding VF; a write instruction; an incoming host write instruction; an internal background write instruction; a lifespan of a non-volatile storage device; a block column; a block of data; a page of data; an indicator of whether data is valid or invalid; an indicator of whether a block column is sealed or open, and whether the block column is associated with or assigned to a host write or a background write; a namespace corresponding to a function or a virtual function; a command to delete a VM associated with a VF; a block column pool; an indicator of a global flash translation layer; a global block column pool; a block column pool associated with or implemented by a single storage device; erasure code (EC) encoded or decoded data; an EC codeword; and a distributed EC codeword.

Figure 9:
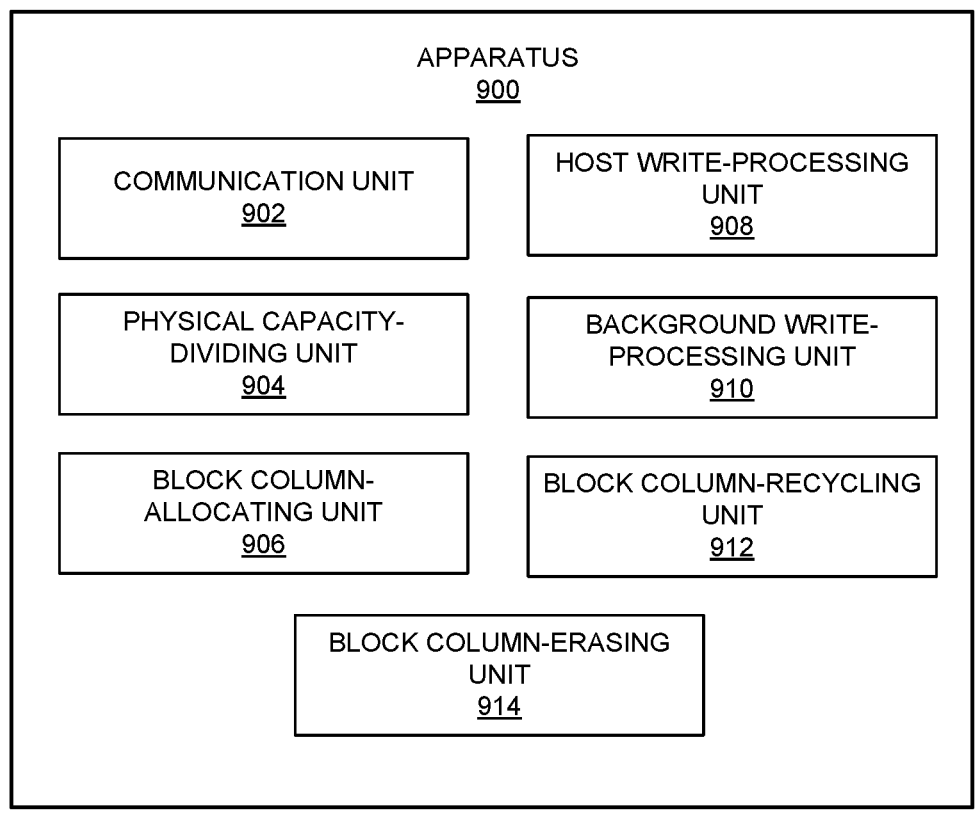
FIG. 9 illustrates an exemplary apparatus that facilitates organization of data, in accordance with an embodiment of the present application.

FIG. 9 illustrates an exemplary apparatus 900 that facilitates organization of data, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Furthermore, apparatus 900 may be integrated in a computer system, or realized as a separate device or devices capable of communicating with other computer systems and/or devices.

Apparatus 900 can comprise modules or units 902-914 which are configured to perform functions or operations similar to modules 820-832 of computer system 800 of FIG. 8, including: a communication unit 902; a physical capacity-dividing unit 904; a block column-allocating unit 906; a host write-processing unit 908; a background write-processing unit 910; a block column-recycling unit 912; and a block column-erasing unit 914.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   allocating, to a function associated with a host, a number of block columns to obtain a physical storage space for the function, wherein a block column corresponds to a block from each of a plurality of dies of a non-volatile storage device; and
   in response to processing an incoming host write instruction and an internal background write instruction, allocating a first block column to the incoming host write instruction and a second block column to the internal background write instruction.

2. The method of claim 1, wherein the function is a virtual function, and wherein the method further comprises:
   in response to receiving a command to delete a namespace or a virtual machine associated with the virtual function:
      erasing the number of block columns of the physical storage space allocated for the virtual function; and
      returning the number of block columns to a block column pool.

3. The method of claim 1, wherein allocating the number of block columns comprises:
   obtaining the number of block columns from a block column pool.

4. The method of claim 1, further comprising:
   in response to receiving the incoming host write instruction, writing data associated with the host write to at least the first block column allocated to the function.

5. The method of claim 1, further comprising:
   identifying a sealed block column which is filled with data; and
   executing the internal background write instruction as a garbage collection process based on the second block column, by:
      copying valid data from blocks of the sealed block column to blocks of the second block column;
      erasing data stored in the blocks of the sealed block column; and
      returning the sealed block column to a block column pool.

6. The method of claim 1,
wherein the non-volatile storage device is one of a plurality of non-volatile storage devices which communicate with a storage controller which includes a global flash translation layer,
wherein the global flash translation layer allocates the number of block columns to the function,
wherein the allocated block columns correspond to at least two of the non-volatile storage devices, and
wherein the function is one of a plurality of virtual functions to which the global flash translation layer allocates block columns.

7. The method of claim 6,
wherein the global flash translation layer maps each virtual function to an allocated physical storage space, and
wherein each physical storage space includes block columns corresponding to the at least two of the non-volatile storage devices.

8. The method of claim 6,
wherein the storage controller further includes an erasure coding (EC) encoder module which performs EC encoding for the functions and an EC decoder module which performs EC decoding for the functions,
wherein data associated with the function is stored in the allocated number of block columns across the at least two non-volatile storage devices, and wherein the method further comprises:
performing, by the EC encoder module, EC encoding on the data prior to the data being stored in the allocated number of block columns to obtain an EC codeword;
distributing the EC codeword to be stored in block columns in the allocated number of block columns across the at least two non-volatile storage devices.

9. The method of claim 1, further comprising:
dividing a physical storage capacity of the non-volatile storage device into a plurality of block groups, wherein a block group comprises a plurality of block columns.

10. A computer system, comprising:
a processor; and
a non-transitory memory coupled to the processor and storing instructions which, when executed by the processor, cause the processor to perform a method, the method comprising:
allocating, to a function associated with a host, a number of block columns to obtain a physical storage space for the function, wherein a block column corresponds to a block from each of a plurality of dies of a non-volatile storage device; and
in response to processing an incoming host write instruction and an internal background write instruction, allocating a first block column to the incoming host write instruction and a second block column to the internal background write instruction.

11. The computer system of claim 10, wherein the function is a virtual function, and wherein the method further comprises:
in response to receiving a command to delete a namespace or a virtual machine associated with the virtual function:
erasing the number of block columns of the physical storage space allocated for the virtual function; and
returning the number of block columns to a block column pool.

12. The computer system of claim 10, wherein allocating the number of block columns comprises:
obtaining the number of block columns from a block column pool.

13. The computer system of claim 10, wherein the method further comprises:
in response to receiving the incoming host write instruction, writing data associated with the host write to at least the first block column allocated to the function.

14. The computer system of claim 10, wherein the method further comprises:
identifying a sealed block column which is filled with data; and
executing the internal background write instruction as a garbage collection process based on the second block column, by:
copying valid data from blocks of the sealed block column to blocks of the second block column;
erasing data stored in the blocks of the sealed block column; and
returning the sealed block column to a block column pool.

15. The computer system of claim 10,
wherein the non-volatile storage device is one of a plurality of non-volatile storage devices which communicate with a storage controller which includes a global flash translation layer,
wherein the global flash translation layer allocates the number of block columns to the function,
wherein the allocated number of block columns correspond to at least two of the non-volatile storage devices, and
wherein the function is one of a plurality of virtual functions to which the global flash translation layer allocates block columns.

16. The computer system of claim 15,
wherein the global flash translation layer maps each virtual function to an allocated physical storage space, and
wherein each physical storage space includes block columns corresponding to the at least two of the non-volatile storage devices.

17. The computer system of claim 15,
wherein the storage controller further includes an erasure coding (EC) encoder module which performs EC encoding for the functions and an EC decoder module which performs EC decoding for the functions,
wherein data associated with the function is stored in the allocated number of block columns across the at least two non-volatile storage devices, and wherein the method further comprises:
performing, by the EC encoder module, EC encoding on the data prior to the data being stored in the allocated number of block columns to obtain an EC codeword;
distributing the EC codeword to be stored in block columns in the allocated number of block columns across the at least two non-volatile storage devices.

18. The computer system of claim 10, wherein the method further comprises:
dividing a physical storage capacity of the non-volatile storage device into a plurality of block groups, wherein a block group comprises a plurality of block columns.

19. An apparatus, comprising:
a block column-allocating unit configured to allocate, to a function associated with a host, number of block columns to obtain a physical storage space for the function, wherein a block column corresponds to a block from each of a plurality of dies of a non-volatile storage device;
a host write-processing unit configured to process an incoming host write instruction; and
a background write-processing unit configured to process an internal background write instruction;
wherein the block column-allocating unit is further configured to, in response to the host write-processing unit processing the incoming host write instruction and the background write-processing unit processing the internal background write instruction, allocate a first block column to the incoming host write instruction and a second block column to the internal background write instruction, and
wherein the block column-allocating unit, the host write-processing unit, and the background write-processing unit perform their functions based on instructions stored on a non-transitory computer readable medium executed by a processor.

20. The apparatus of claim 19, wherein the function is a virtual function, wherein the number of block columns are allocated from and obtained from a block column pool, and wherein the apparatus further comprises:
a physical capacity-dividing unit configured to divide a physical storage capacity of the non-volatile storage device into a plurality of block groups, wherein a block group comprises a plurality of block columns;
a communication unit configured to receive a command to delete a namespace or a virtual machine associated with the virtual function; and
a block column-recycling unit configured to, in response to the communication unit receiving the command to delete the namespace or the virtual machine associated with the virtual function:
erase the number of block columns of the physical storage space allocated for the virtual function; and
return the number of block columns to the block column pool, wherein the non-volatile storage device is one of a plurality of non-volatile storage devices which communicate with a storage controller which includes a global flash translation layer,
wherein the global flash translation layer allocates the number of block columns to the function,
wherein the allocated block columns correspond to at least two of the non-volatile storage devices,
wherein the function is one of a plurality of virtual functions to which the global flash translation layer allocates block columns, and
wherein the physical capacity-dividing unit, the communication unit, and the block column-recycling unit perform their functions based on the instructions stored on the non-transitory computer readable medium executed by the processor.

* * * * *